Dec. 15, 1959   J. R. FURRER ET AL   2,917,005
LIGHTWEIGHT CAR TRUCK
Filed Jan. 24, 1957   2 Sheets-Sheet 1

INVENTORS
Gerd Runken
John R. Furrer
BY Robert A. Shields
ATTORNEY

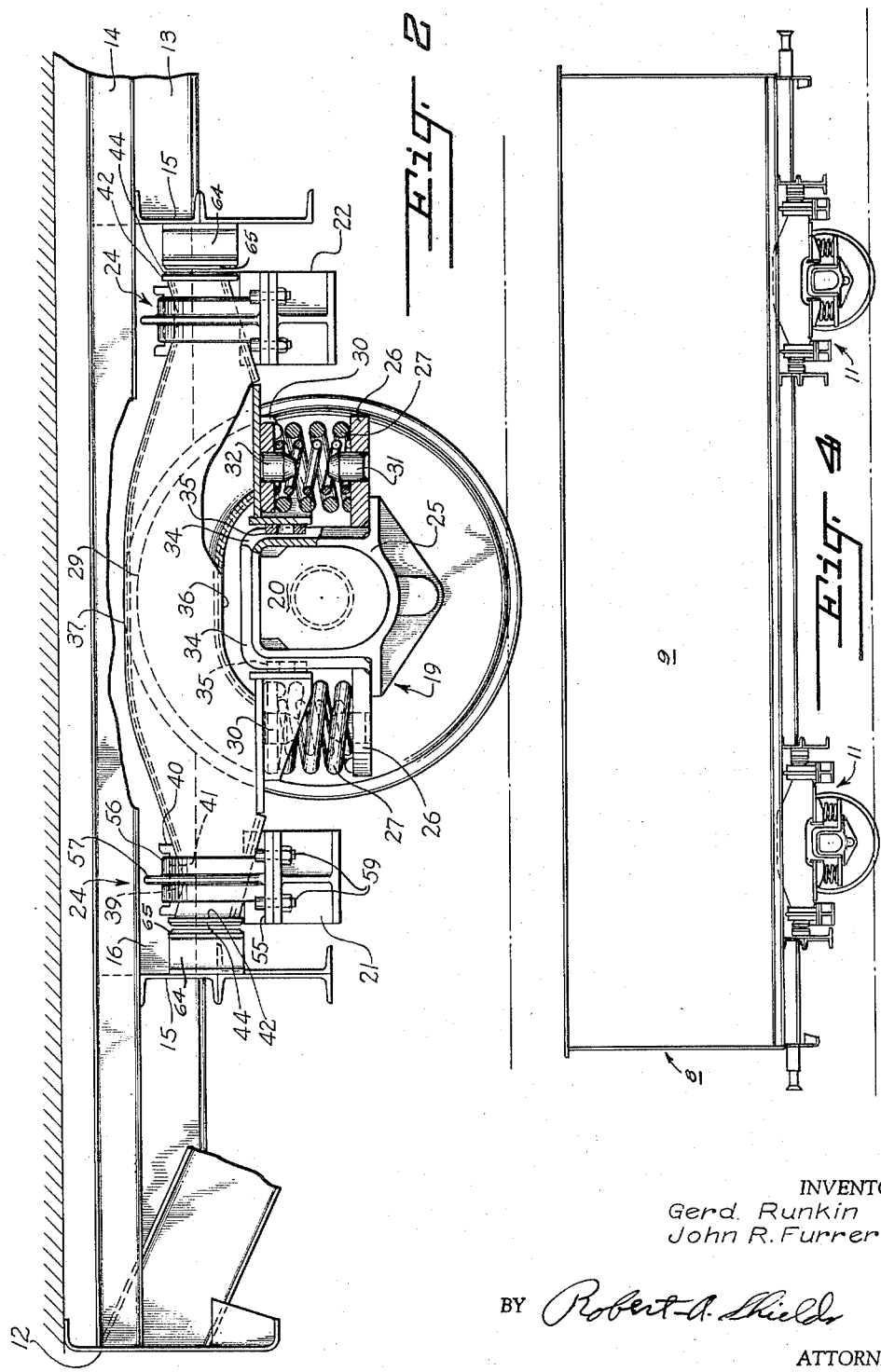

United States Patent Office 2,917,005
Patented Dec. 15, 1959

2,917,005

LIGHTWEIGHT CAR TRUCK

John R. Furrer, Bronxville, and Gerd Runken, Cold Spring, N.Y., assignors to ACF Industries, Incorporated, New York, N.Y., a corporation of New Jersey Application January 24, 1957, Serial No. 636,028

8 Claims. (Cl. 105—157)

This invention relates to car trucks, and, more particularly, to lightweight, single-axle trucks for supporting railway cars.

Heretofore, it has been proposed to construct single-axle trucks having a rigid, unitary frame including side frames and bolsters, transoms or end pieces integrally connected thereto. While such trucks might prove satisfactory under certain limited conditions, it is now known that the load stresses set up in such frames under modern high load, high speed operating conditions require the frames to be considerably built-up, thereby increasing their weight and bulk and eliminating their intended low weight advantages.

Accordingly, it is an object of the present invention to provide a lightweight car truck which is free of the foregoing difficulties and disadvantages.

It is another object to provide such a truck which is not rigid as those heretofore known.

It is another object to provide such a truck which is able to withstand the high stresses of present day operating conditions.

It is another object to provide such a truck in which body weight is distributed equally to the wheels.

It is a further object to provide such a truck wherein the transmission of all thrusts to or from the wheels is through resilient means.

It is still a further object to provide such a truck which is simple and economical in construction, reliable and rugged in service and requires a minimum of maintenance.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a vehicle body supporting truck comprising a wheel and axle assembly, spaced side frames mounted by journal bearings at each end of the assembly and each including a resiliently supported yoke member, and end pieces supported by corresponding ends of the yoke members for limited relative movement with respect to the latter.

A preferred embodiment of the invention has been chosen for purposes of illustration and description, and is shown in the accompanying drawing, forming a part of the specification, wherein:

Fig. 2 is a side elevational view of the truck and a fragmentary portion of the underframe illustrated in Fig. 1;

Fig. 4 is a side elevational view illustrating a typical railway car mounted upon a pair of single-axle trucks in accordance with the present invention.

Figure 1:
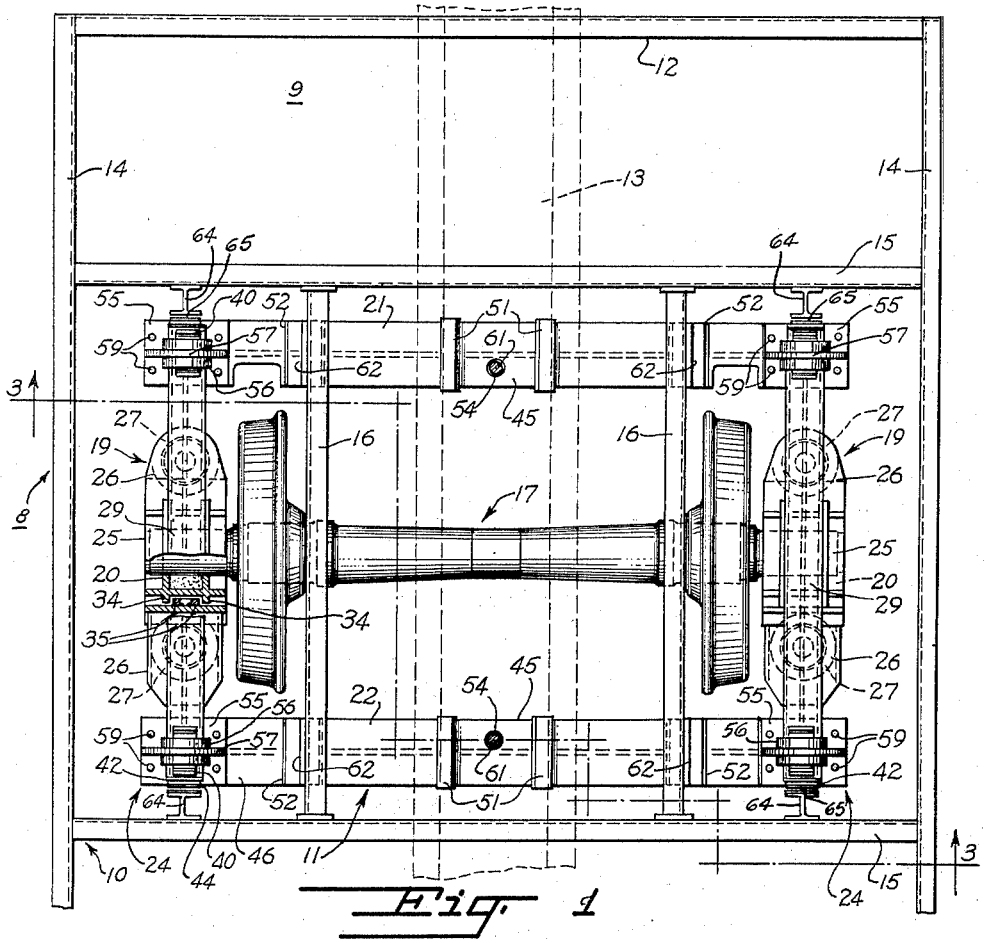
Fig. 1 is a top plan view of a truck in accordance with the present invention and illustrating a fragmentary portion of a typical underframe in relation thereto.

Referring to the drawing, and more particularly, to Fig. 1 thereof, there is shown a portion of a car 8 having a body 9 having an underframe 10, the car further having a truck 11 in accordance with the present invention for supporting an end of the car.

The underframe includes an end sill 12, a downwardly opening, flanged channel beam constituting a center sill 13, side sills 14, cross bearers 15 extending between the side sills, and longitudinal braces 16 extending between a pair of adjacent cross bearers and spaced inwardly of the side sills. As shown in Fig. 2, the cross bearers 15 depend from the side sills and are formed of two outwardly facing channel beams, one secured directly below the other.

The truck 11 includes a single-axle wheel and axle assembly 17, side frames 19 mounted by conventional journal bearings 20 at the axle ends outboard of the wheels, end pieces 21 and 22 extending transversely of the truck between side frames and connecting means 24 by which the end pieces are suspended from the side frames for limited movement with respect to the latter.

The side frames 19 each comprise the usual journal box 25 in which is mounted the bearing 20, a pair of stationary spring supports 26, springs 27 and a yoke 29 provided with spring cups 30. The spring supports 26 are disposed longitudinally, one on each of the journal box sides, fore and aft, in the customary manner and each is provided at its center with an upwardly extending pin 31. Each set of springs 27 consists of a pair of concentric helical springs resting on the supports 26 and extending upwardly into the downwardly opening spring cups 30 which are integrally mounted on the underside of the yokes 29. These cups are provided with depending central pins 32 opposite pins 31 for maintaining the spring in position.

Each side of the journal box 25 is formed with a pair of parallel, spaced, vertically extending ribs 34 providing a recess therebetween for the reception of a pair of projections 35 formed on each of the spring cups 30 for a purpose to be described hereinafter.

The yokes 29 are each elongate members extending generally horizontally perpendicular to the axle and formed with a central recess 36 to enable the same to be supported over the journal boxes by the springs 27. The upper edges 37 of the yokes 29 are inclined downwardly fore and aft from the central zone thereof to a point adjacent the ends thereof where they curve upwardly forming dells 39. Each end of each yoke has welded thereto a generally U-shaped saddle plate 40 which extends across one of the dells 39 and provides an upwardly facing bearing surface 41. The yokes terminate outwardly of the saddle plates with block members 42, to the outer surface of each of which is secured a flat, vertically faced wear plate 44.

Figure 3:
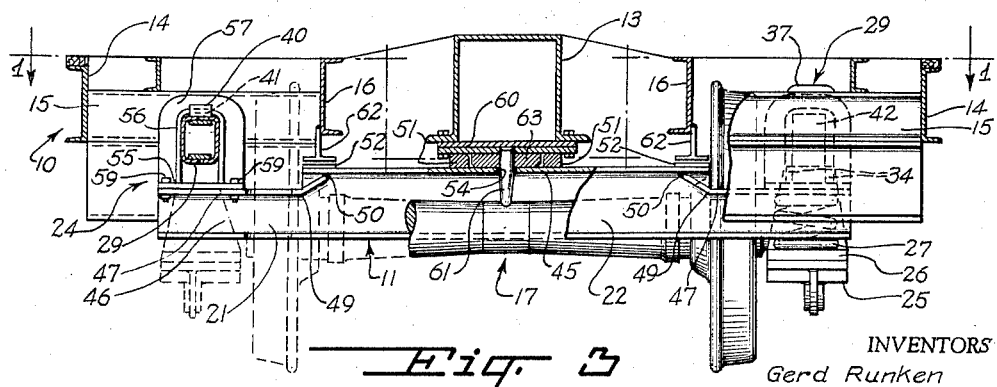
Fig. 3 is a front elevational view of the truck and a fragmentary portion of the underframe illustrated in Figs. 1 and 2.

As shown in Fig. 3 end pieces 21 and 22 are each formed of a central zone 45 comprising an I beam or a pair of back-to-back C beams, and a pair of end zones 46 comprising extensions of the central zone but having a longitudinal upper section cut away and the upper flange replaced by a similar flange 47 at a lower level. The flange 47 may be bent upwardly as at 49 and secured to the under surface of the upper flange of the central zone as at 50.

The central zones of the end pieces are each provided with a pair of longitudinally extending bearing blocks 51 straddling the center thereof, and with a bearing plate 52 mounted at each end thereof. The end pieces are also provided with an aperture 54 in the top flange of the central zone 45 midway between the bearing blocks 51 and inwardly of the central zone web. Apertures 54 are located at the midpoint of length of the end pieces 21, 22 and on the longitudinal center line of the car.

The connecting means 24 are hangers each comprising a flat platform section 55 upon which is centrally fixed an inverted U-shaped bearing section 56 which is reinforced by a central exterior rib 57.

To mount the end pieces 21 and 22, the platform sections 55 of the connecting hangers 24 are connected by bolts 59 to the upper flanges of the end zones 46 of the end pieces, suitable apertures being provided therein for this purpose. The end pieces are then manipulated so as to cause each hanger to pass over an end of a yoke 29 and the bearing section 56 is loosely seated on the bearing surface 41 of the appropriate saddle plate 40, whereby each end piece is supported transversely of the truck by corresponding ends of the yokes 29 and has limited freedom of universal angular movement relative to the latter.

As shown in Fig. 3, the center sill 13 has a plate member 60 extending across the open bottom thereof and bolted to its flanges. Tapered vertically extending pivot pins 61 are secured as by welding to the plate member 60 at its center, which is located on the longitudinal center line of the car, and are adapted to fit loosely into the apertures 54 in the central zone 45 of the end pieces so that the outer portions of the plate member 60 rest on the bearing blocks 51. The pins 61 are additionally braced by blocks 63 which are welded to the undersurface of the plate member 60 and which fit between the bearing blocks 51. Fig. 4 shows a car body supported at each end by a truck 11 in the manner described.

The longitudinal braces 16 have secured to their lower ends short sections of longitudinally disposed, inverted T bars 62. These T bars are so mounted that their lower surfaces normally directly overlie the side bearing plates 52 and are spaced therefrom by a distance of the order of about one-quarter to one-half inch.

When a truck of the type described herein is placed into service, it will be seen that the rigidity has been taken out of the various framing members by employing the connecting hangers 24 which allow the load stresses set up in the truck to be largely absorbed by permitting limited relative movement of the parts, the bearing sections 56 being in their applied condition closed links constituting loose connections between the end pieces 21, 22 and the yokes 29. The two yokes 29 and end pieces 21, 22 are thus constituted a parallelogram jointed at its corners and which is deformed about the two pins 61 as pivots to provide a virtual pivot on the car center line for axle assembly 17 so that the car may traverse curved trackage.

As the car body is jounced upwardly, the pin 61 in the aperture 54 assures guided movement and maintains the car body and truck in proper relative positions. Any forces or shocks tending to rock the body about a longitudinal axis will cause lowering of one of the cross bearers until its respective T bar 62 contacts the side bearing 52 beneath it, at which point further rolling will be resisted. Limited rolling is permitted by the loose fit of the pin 61 in the aperture 54 and the axis about which such rolling occurs is between the plate member 60 and one of the bearing blocks supporting the same. Longitudinal body movement is limited by the wear plates 44 at the ends of the yokes 29. For this purpose, suitable body structure may be provided on the appropriate cross bearers such as four beams 64 each having a vertical wear surface 65 facing and in normally closely spaced relation to one of the plates 44.

Lateral shocks are taken in the truck frame by projections 35 acting against the ribs 34 on the journal box. This construction controls lateral movement of the yokes 29 and permits vertical movement thereof.

If desired, the blocks 63, as well as the bearing plates 52 and the wear plates 44, may be formed of rubber for certain applications, such as in passenger car construction where greater cushioning and noise deadening is required.

From the foregoing description it will be seen that the present invention provides a simple, economical, reliable and lightweight car truck which distributes body weight equally to the wheels. It will also be seen that such a truck is able to withstand the high stresses of present day operating conditions and is constructed without the rigidity heretofore built into trucks so that the parts may be made smaller and lighter.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. A vehicle body supporting truck comprising a wheel and axle assembly, spaced side frames mounted by journal bearings at each end of said assembly and each including a yoke member, end pieces extending transversely of the vehicle body between corresponding ends of said yoke members and being loosely connected to said ends so as to have limited angular movement relative to said yoke members, and stop means at each end of each yoke member for limiting longitudinal movement of said members with respect to the vehicle body.

2. A vehicle body supporting truck comprising a wheel and axle assembly, spaced side frames mounted by journal bearings at each end of said assembly and each including a yoke member resiliently supported by said journal bearing, end pieces extending transversely of the vehicle body between corresponding ends of said yoke members and being loosely connected to said ends so as to have limited angular movement relative to said yoke members, stop means at each end of each yoke member for limiting longitudinal movement of said members with respect to the vehicle body, vehicle body central bearing means mounted midway of each end piece, and side bearings mounted adjacent each end of said end pieces.

3. A vehicle body supporting truck comprising a wheel and axle assembly, spaced side frames mounted by journal bearings at each end of said assembly and each including a yoke member resiliently supported by said journal bearing, end pieces extending transversely of the vehicle body between corresponding ends of said yoke members and being loosely connected to said ends so as to have limited angular movement relative to said yoke members, and stop means at each end of each yoke member for limiting longitudinal movement of the said members with respect to the vehicle body.

4. A vehicle body supporting truck comprising a single-axle wheel and axle assembly, spaced side frames mounted by journal bearings at each end of said assembly and each including a yoke member resiliently supported by said journal bearings, end pieces extending transversely of the vehicle body between corresponding ends of said yoke members, means loosely connecting said end pieces and said yoke members for limited relative angular movement therebetween, and stop means at each end of each yoke member for limiting longitudinal movement of said members with respect to the vehicle body.

5. A vehicle truck according to claim 4, wherein said means loosely connecting said end pieces and said yoke members are closed links and are bolted to said end pieces.

6. A railway car having a car body and a truck supporting at least a portion of said body on a wheel and axle assembly, said truck comprising a side frame mounted by a journal bearing at each end of said assembly and each side frame including a yoke member resiliently supported from said journal bearing, said truck further comprising two end pieces, each end piece extending transversely of said car between corresponding ends of said yoke members and being loosely connected to said ends so as to have limited freedom of universal angular movement relative to said yoke members, and a vertically extending pivot means loosely pivotally connecting each end piece at the midpoint of its length to said car body on the longitudinal center line of the latter, said car body bearing on said end pieces adjacent said pivot means.

7. A railway car having a car body and a truck supporting at least a portion of said body on a wheel and axle assembly, said truck comprising a side frame mounted by a journal bearing at each end of said assembly and each side frame including a yoke member resiliently supported from said journal bearing, said truck further comprising two end pieces, each end piece extending transversely of said car between corresponding ends of said yoke members and being loosely connected to said ends so as to have limited freedom of universal angular movement relative to said yoke members, and a vertically extending pivot pin connected to said car body on the longitudinal center line of the latter above each end piece and loosely pivotally engaging the respective end piece at the midpoint of length of the latter, said car body and said end pieces each comprising bearing means adjacent said pivot pins and said car body bearing on said end pieces through said bearing means.

8. A railway car having a car body and a truck supporting at least a portion of said body on a wheel and axle assembly, said truck comprising a side frame mounted by a journal bearing at each end of said assembly and each side frame including a yoke member resiliently supported from said journal bearing, said truck further comprising two end pieces, each end piece extending transversely of said car between corresponding ends of said yoke members and being loosely connected to said ends so as to have limited freedom of universal angular movement relative to said yoke members, a vertically extending pivot pin connected to said car body on the longitudinal center line of the latter above each end piece and loosely pivotally engaging the respective end piece at the midpoint of length of the latter, said car body bearing on said end pieces adjacent said pivot pins, a substantially vertically faced wear plate mounted on each end of each yoke member, and four members mounted on said body and each having a substantially vertical wear surface facing and in normally closely spaced relation to one of said wear plates for limiting longitudinal relative movement between said body and said truck.

References Cited in the file of this patent
UNITED STATES PATENTS

| | | |
|---|---|---|
| 931,413 | Grant | Aug. 17, 1909 |
| 1,348,991 | Gilpin | Aug. 10, 1920 |
| 2,135,728 | Oelkers | Nov. 8, 1938 |